(12) United States Patent
Thor et al.

(10) Patent No.: US 7,559,873 B2
(45) Date of Patent: Jul. 14, 2009

(54) RESOLVING TIE-UP IN A CLUTCH-TO-CLUTCH TRANSMISSION

(75) Inventors: Todd J. Thor, Byron, MI (US); David W. Wright, Howell, MI (US); Brian J. Pellerito, Ortonville, MI (US); Craig A. Brunstetter, Marysville, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 429 days.

(21) Appl. No.: 11/589,692

(22) Filed: Oct. 30, 2006

(65) Prior Publication Data

US 2007/0249463 A1 Oct. 25, 2007

Related U.S. Application Data

(60) Provisional application No. 60/794,799, filed on Apr. 25, 2006.

(51) Int. Cl.
*B60W 10/10* (2006.01)
(52) U.S. Cl. .............................. 477/79; 477/80; 477/156
(58) Field of Classification Search .................... 477/70, 477/79, 80, 115, 156
See application file for complete search history.

(56) References Cited

U.S. PATENT DOCUMENTS

| | | | | |
|---|---|---|---|---|
| 6,106,435 A * | 8/2000 | Endo et al. | .................. | 477/148 |
| 6,503,172 B2 * | 1/2003 | Ochi et al. | .................. | 477/143 |
| 6,711,964 B2 * | 3/2004 | Ochi et al. | .................... | 74/337 |
| 6,740,005 B2 * | 5/2004 | Watanabe et al. | ........... | 477/110 |
| 6,863,640 B2 * | 3/2005 | Kobayashi et al. | .......... | 477/156 |
| 7,074,158 B2 * | 7/2006 | Watanabe et al. | ........... | 477/159 |
| 7,212,898 B2 * | 5/2007 | Whitton et al. | ............... | 701/51 |
| 2005/0096819 A1 | 5/2005 | Keyse et al. | | |

FOREIGN PATENT DOCUMENTS

JP 2008025624 A * 2/2008

* cited by examiner

*Primary Examiner*—Ha D. Ho

(57) ABSTRACT

A vehicle including a transmission having a plurality of clutches for providing a plurality of speed ratios. A control module of the vehicle detects a possible tie-up of at least two of the clutches. Based on the detecting, the control module releases one of the possibly tied-up clutches. After the release, the control module determines whether a tie-up condition occurred. Based on the determining, the control module reapplies pressure to the released clutch. Loss of driver control of the vehicle thus can be prevented in the event of clutch tie-up.

19 Claims, 6 Drawing Sheets

US 7,559,873 B2

RESOLVING TIE-UP IN A CLUTCH-TO-CLUTCH TRANSMISSION

CROSS-REFERENCE TO RELATED APPLICATIONS

This application claims the benefit of U.S. Provisional Application No. 60/794,799, filed on Apr. 25, 2006. The disclosure of the above application is incorporated herein by reference.

FIELD

The present disclosure relates to clutch-to-clutch automatic transmissions and more particularly (but not exclusively) to resolving tie-up conditions in clutch-to-clutch transmissions.

BACKGROUND

The statements in this section merely provide background information related to the present disclosure and may not constitute prior art.

In a vehicle powertrain having a clutch-to-clutch automatic transmission, a plurality of clutches can be selectively engaged and disengaged to provide speed ratios between input and output shafts of the transmission. Shifting from one speed ratio to another speed ratio involves disengaging an off-going clutch and engaging an oncoming clutch. During a shift, a clutch fault could occur. For example, failure of an off-going clutch to fully disengage may cause clutch tie-up. Clutch tie-up can cause an increase in absorption of shift energy by an oncoming clutch and could eventually lead to component failure.

SUMMARY

In one implementation, the present disclosure is directed to a vehicle including a transmission having a plurality of clutches for providing a plurality of speed ratios. The vehicle includes a control module that detects a possible tie-up of at least two of the clutches. Based on the detecting, the control module releases one of the possibly tied-up clutches. After the release, the control module determines whether a tie-up condition occurred. Based on the determining, the control module reapplies pressure to the released clutch.

In another implementation, the disclosure is directed to a method of controlling a transmission having a plurality of clutches for providing a plurality of speed ratios. A possible tie-up of at least two of the clutches is detected. Based on the detecting, one of the at least two of the clutches is released. Based on whether a gear fault occurred, it is determined whether a tie-up condition existed. Based on the determining, pressure is reapplied to the released clutch.

In yet another implementation, the disclosure is directed to a transmission control system for a clutch-to-clutch transmission. The control system includes a control module configured to detect a possible tie-up of at least two clutches of the transmission. Based on the detecting and on a previously commanded gear ratio, the control module releases one of the at least two of the clutches and determines whether a tie-up condition occurred. Based on the determining, the control module reapplies pressure to the released clutch or reapplies a previously faulted gear ratio.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
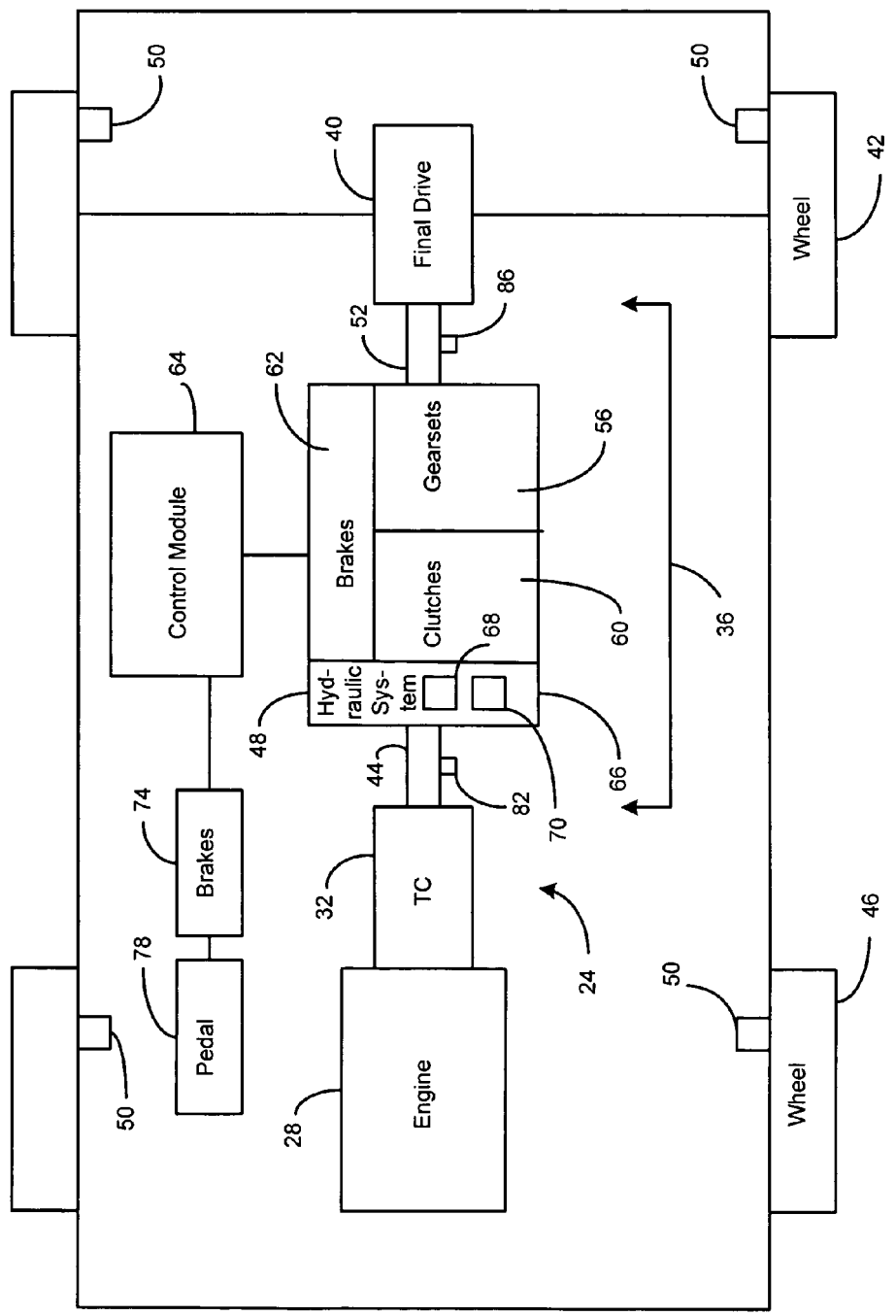
FIG. 1 is a conceptual diagram of a vehicle including a transmission and transmission control system in accordance with one implementation of the disclosure.

A vehicle in accordance with one implementation of the disclosure is indicated generally in FIG. 1 by reference number 20. The vehicle 20 includes a powertrain, indicated generally by reference number 24. The powertrain 24 includes an engine 28, a torque converter 32, a transmission 36, and a final drive mechanism 40. The final drive 40 provides torque to driven wheels 42. In the present example, the vehicle 20 has two undriven wheels 46. It should be noted, however, that implementations also are contemplated for use in vehicles having four driven wheels. Each wheel (42, 46) has a wheel speed sensor 50. Implementations also are contemplated, however, in which fewer than four wheel speed sensors are used.

The transmission 36 includes an input shaft 44, a gearbox 48 and an output shaft 52. The transmission 36 is a clutch-to-clutch transmission. Accordingly, the gearbox 48 includes a plurality of gearsets 56, a plurality of clutches 60 and a plurality of brakes 62. A hydraulic system 66 provides fluid control via a plurality of pressure switches 68 and solenoids 70 for the clutches 60 and brakes 62. Speed sensors 82 and 86 respectively sense speeds of the input shaft 44 and output shaft 52. It should be noted that various implementations of the present disclosure can be practiced in connection with various powertrains and various types of clutch-to-clutch transmissions. The transmission 36 is controlled by a control module 64 which may be or reside in, e.g., a powertrain controller and/or engine controller. It should be understood that the control module 64 could be incorporated in a transmission control system or in other or additional control systems of the vehicle 20. The control module 64 receives inputs from a plurality of components of the vehicle 20, including a braking system 74 which can be activated using a brake pedal 78.

When the vehicle 20 is in operation, energy produced by the engine 28 is converted into drive torque in the torque converter 32. Drive torque is transferred through the transmission 36 to the final drive 40 and driven wheels 42 of the vehicle 20. Clutches 60 are selectively engaged and disengaged relative to the gearsets 56 to provide speed ratios between the input shaft 44 and the output shaft 52. When a shift from one speed ratio to another is commanded through the control module 64, typically an engaged clutch 60 is commanded to become disengaged while a disengaged clutch 60 is commanded to become engaged.

Figure 2:
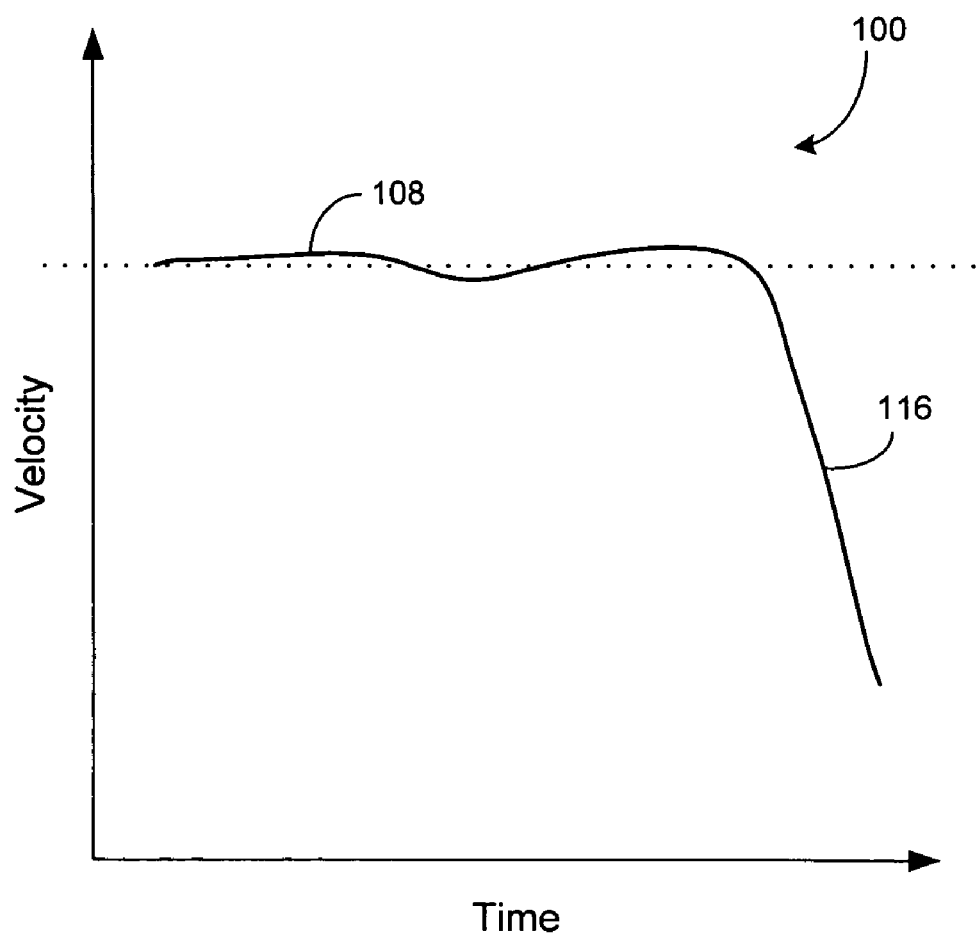
FIG. 2 is a graph of transmission output shaft velocity and deceleration relative to time.

If, for example, excessive torque-holding capacity is added to an oncoming clutch 60 while an off-going clutch 60 still has torque-holding capacity, a clutch tie-up may occur. Failure of an off-going clutch to fully disengage may also cause tie-up. Other causes of tie-up are possible. For example, if a situation arises in which a third clutch 60 is caused to be applied during steady-state operation, tie-up could result. Tie-up typically causes vehicle deceleration. A graph of transmission output shaft speed and deceleration relative to time is indicated generally in FIG. 2 by reference number 100. When a vehicle travels at essentially constant speed, transmission output shaft speed 108 also is essentially constant. A clutch tie-up could cause the transmission output shaft speed (and hence the vehicle) to decelerate suddenly, as shown in speed segment 116. Sudden vehicle deceleration (also referred to as vehicle "startle") can make a driver feel as if the brake system 74 has been applied. Vehicle startle, however, may also be caused by factors other than clutch tie-up. For example, wheel slip may cause a startle event when a vehicle being driven on icy pavement spins one or more wheels which subsequently catch the pavement. Startle may also result from an aggressive downshift by a vehicle driver and/or by high acceleration of the torque converter 32.

Accordingly, one implementation of a method of controlling a clutch-to-clutch transmission is indicated generally in FIGS. 3A-3D by reference number 200. Generally, the method 200 includes detecting a possible tie-up of at least two clutches. Based on the detecting, pressure to one of the clutches is released. It is determined whether a tie-up condition existed. Based on the determining, pressure may be reapplied to the released clutch before the released clutch is exhausted.

The method 200 shall be described with reference to the vehicle 20. It will be appreciated by those skilled in the art that the flow diagrams of FIGS. 3A-3D are only exemplary, and that various aspects of the implementation could be iterated and/or arranged in various ways to provide the described functionality.

Figure 3A:
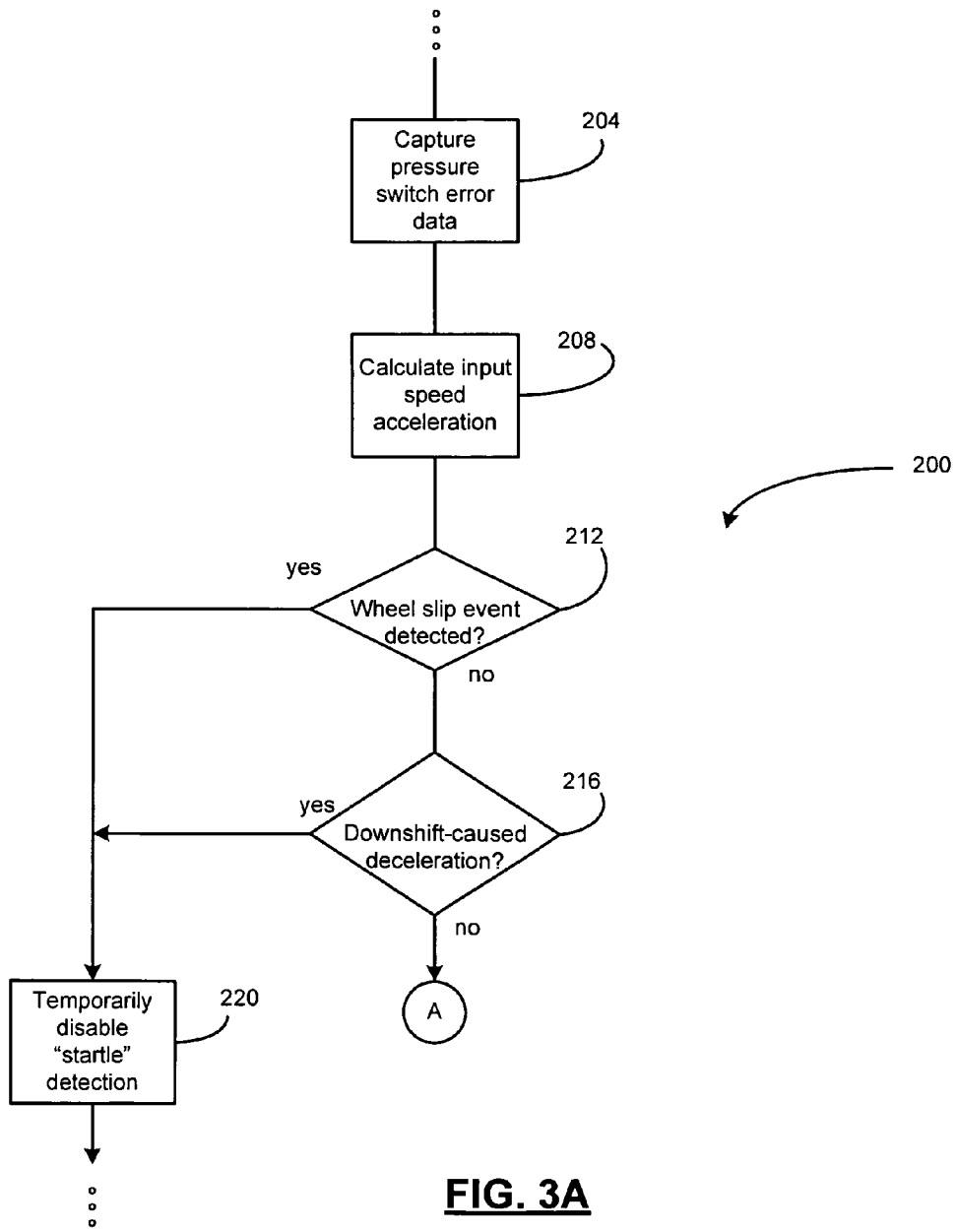
FIGS. 3A-3D are flow diagrams of a method of controlling a transmission in accordance with one implementation of the disclosure.
Figure 3B:
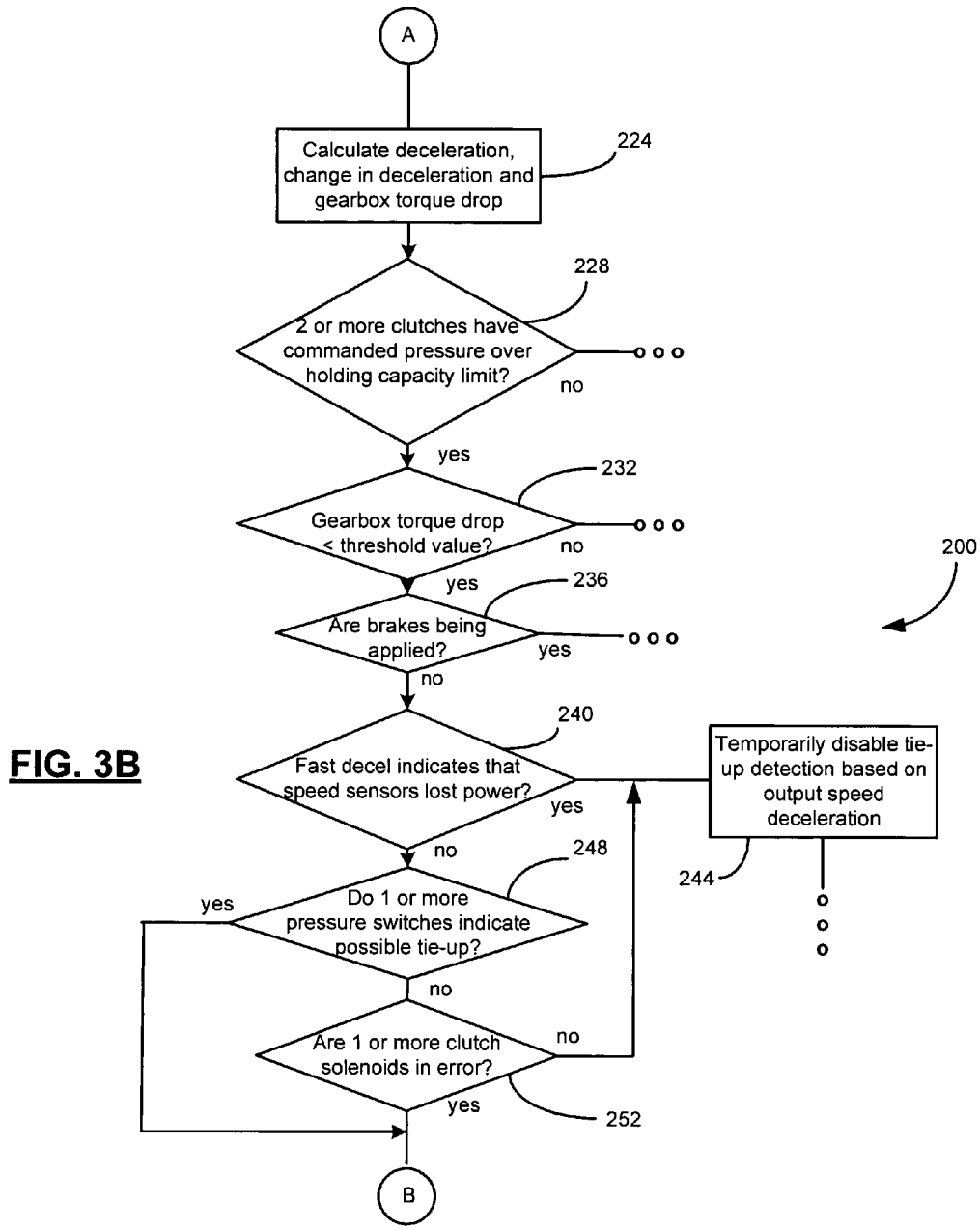
Figure 3C:
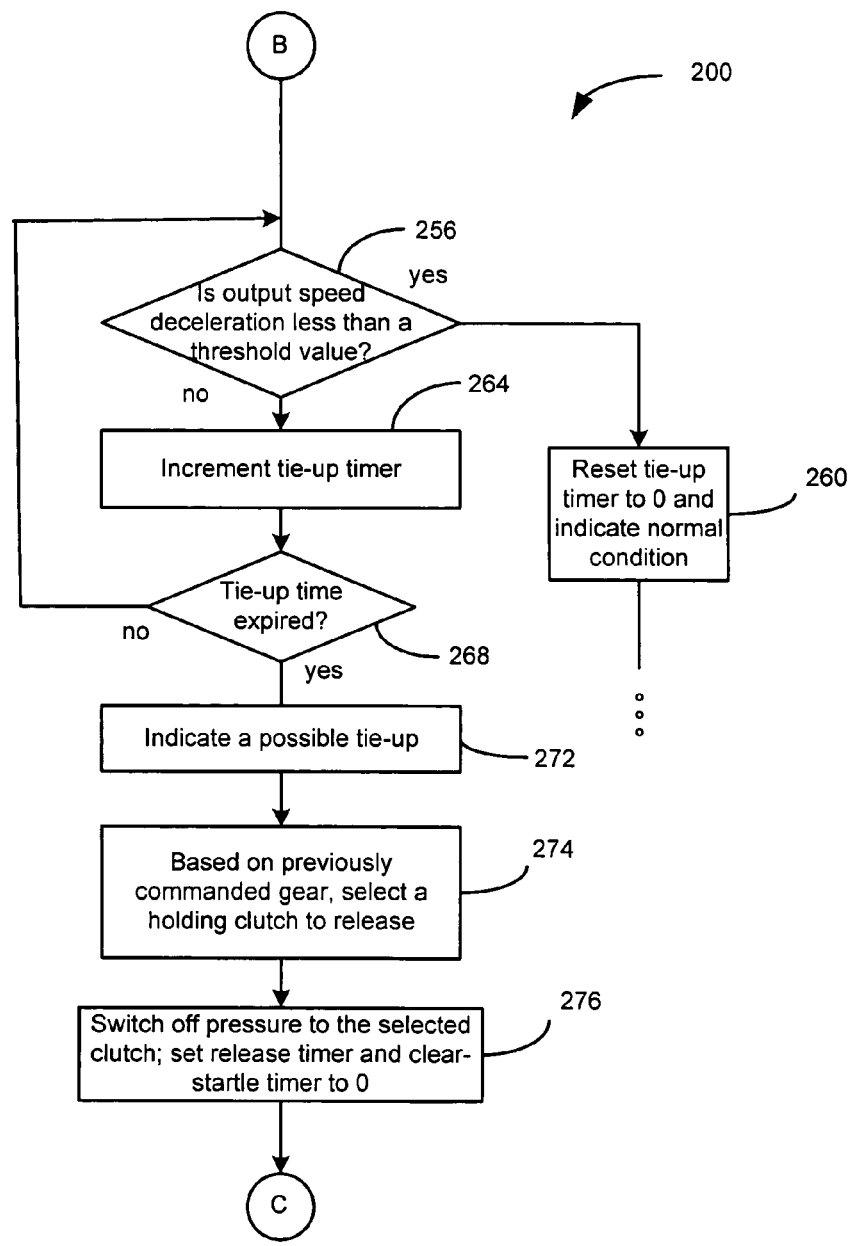

Referring now to FIG. 3A, in step 204 the control module 64 captures error data reported by pressure switches 68. In step 208 the control module 64 calculates input speed acceleration, i.e., acceleration of the input shaft 44. The input speed acceleration may be used, for example, to disable deceleration-based tie-up detection when deceleration of the vehicle 20 is caused by a downshift.

In step 212 the control module 64 uses input from the wheel speed sensors 50 to determine whether a wheel slip event is detected. Specifically and for example, the control module 64 analyzes speed differential(s) between driven wheels 42 and non-driven wheels 46 to determine whether wheel slip is occurring or has occurred within a predetermined time period. If yes, then in step 220 the control module 64 temporarily disables startle detection, e.g., until after the wheel slip is assumed to have subsided. If no wheel slip is detected in step 212, then in step 216 the control module 64 uses input shaft speed and acceleration to determine, e.g., whether a deceleration caused by a power downshift has occurred. If the result is yes in step 216, then control is transferred to step 220, in which startle detection is temporarily disabled. If no downshift-caused deceleration is detected, control is transferred to step 224, shown in FIG. 3B.

In the method 200, output shaft speed and deceleration changes may be monitored to detect tie-up conditions. In step 224, the control module 64 determines deceleration and change in deceleration of the transmission output shaft 52.

The control module 64 also uses, e.g., mass air flow to and/or spark timing of the engine 28 to determine torque drop across the gearbox 48.

In step 228 it is determined whether two or more clutches 60 have commanded pressure over a holding capacity limit. If not, then it is assumed that tie-up is not present and control is transferred elsewhere in the method 200. If the result is yes in step 228, then the control module 64 determines in step 232 whether gearbox torque drop is less than a predetermined threshold value. If not, then it is assumed that tie-up is not present and control is transferred elsewhere in the method 200. If the result is yes in step 232, then it is determined whether the brake system 74 is being applied. If yes, then it is assumed that tie-up is not present and control is transferred elsewhere in the method 200. If the result is no in step 236, then in step 240 it is determined whether the output shaft deceleration is so fast as to indicate that the shaft speed sensors 86 and/or 82 have lost power and/or are not operating accurately. If the sensors 86 and/or 82 are not operational, then in step 244, tie-up detection based on output shaft speed deceleration is temporarily disabled. If the sensors 86 and/or 82 are operational, the control module 64 determines in step 248 whether one or more pressure switches 68 indicate a possible tie-up. If yes, control is transferred to step 256, shown in FIG. 3C. If in step 248 the result is no, then it is determined in step 252 whether one or more clutch solenoids 70 are in error. If not, control passes to step 244. If one or more clutch solenoids 70 are in error, then control passes to step 256, shown in FIG. 3C.

Tie-up may be possible when output shaft speed deceleration exceeds a predetermined threshold value for a predetermined time period. Thus, in step 256 it is determined whether output shaft speed deceleration is less than a predetermined threshold value. If yes, then a tie-up timer is reset to zero and a normal condition is indicated. If output shaft deceleration exceeds the threshold, then the tie-up timer is incremented in step 264. If in step 268 the tie-up timer has expired, a possible tie-up is indicated in step 272. Otherwise control returns to step 256.

When tie-up occurs, releasing one of the holding clutches 60 can resolve the tie-up condition. Accordingly, in step 274, the control module 64 selects a clutch 60 to which pressure is commanded. Such clutch is selected based on the previously commanded gear. In step 276, the control module 64 causes pressure to be switched off to the selected clutch 60. A release timer and a clear-startle timer are set to zero, and control passes to step 278, shown in FIG. 3D.

Figure 3D:
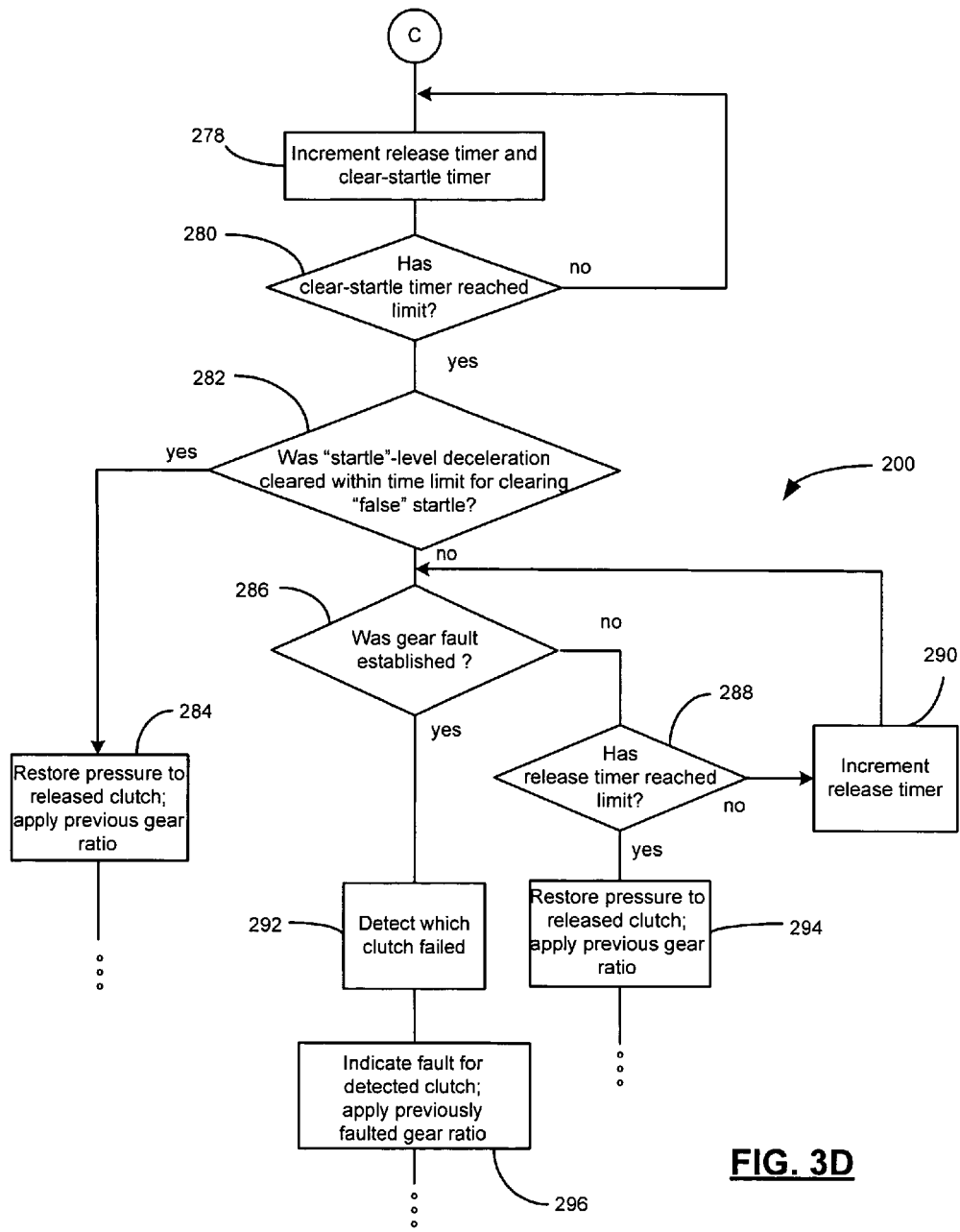

If tie-up is determined not to have occurred, the control module 64 may reapply the released clutch 60 as described with reference to FIG. 3D. The clear-startle timer is used to time a period in which the control module 64 tests for the clearing of a startle condition not caused by tie-up. The release timer is used to time a period (longer than the "clear-startle" period) in which the control module 64 tests for the establishment of a gear fault resulting from clutch tie-up. Referring now to FIG. 3D, in step 278 the release timer and clear-startle timer are incremented. The clear startle timer is incremented until it reaches the predetermined "clear-startle" time limit, as determined in step 280. In step 282 it is determined whether the detected deceleration cleared, and startle conditions did not reappear, within the "clear-startle" time limit. If startle conditions are no longer present, then in step 284 the control module 64 causes pressure to be restored to the previously released clutch 60, and the previous gear ratio is applied. If the deceleration is determined in step 282 not to have cleared, then in step 286 it is determined whether the presence of a gear fault was established. If not, then in step 288 it is determined whether the release timer has reached its predetermined limit. If the release timer has not yet expired in step 288, then in step 290 the release timer is incremented and control returns to step 286. If the release timer is determined to have expired in step 288 without a gear fault having been established, it is assumed that no tie-up occurred. Accordingly, in step 294 pressure is restored to the released clutch 60 and the previous gear ratio is applied. If in step 286 it is determined that a gear fault was established, it is assumed that tie-up occurred. It also is assumed that the foregoing clutch release resolved the tie-up. In step 292 the control module 64 detects which clutch 60 failed. In step 296, a fault is indicated for the failed clutch 60, and the gear ratio in which the gear fault was established is reapplied.

Implementations of the foregoing method and transmission control system can prevent the loss of driver control of a vehicle in the event of a transmission tie-up. Additionally, conditions other than tie-up that may cause vehicle startle can be detected and distinguished from tie-up conditions. Thus the above method and system can provide increased driver safety and driving comfort.

What is claimed is:

1. A vehicle including a transmission having a plurality of clutches for providing a plurality of speed ratios, said vehicle comprising a control module that:
    detects a possible tie-up of at least two of the clutches;
    based on the detecting, releases one of the possibly tied-up clutches;
    after the release, determines whether a tie-up condition occurred; and
    based on the determining, reapplies pressure to the released clutch.

2. The vehicle of claim 1 wherein said control module releases one of the clutches based on whether pressure is commanded to the one of the clutches.

3. The vehicle of claim 1 wherein said control module reapplies pressure to the released clutch based on whether a gear ratio fault is detected.

4. The vehicle of claim 1 wherein said control module detects an output speed deceleration of the transmission greater than a predetermined threshold; and
    determines whether the deceleration was caused by a tie-up condition.

5. The vehicle of claim 1 wherein said control module reapplies pressure to the released clutch based on whether a startle condition was cleared within a predetermined time.

6. The vehicle of claim 1 wherein, if a gear ratio fault is obtained within a predetermined time, said control module reapplies the faulted gear ratio.

7. A method of controlling a transmission having a plurality of clutches for providing a plurality of speed ratios, said method comprising:
    detecting a possible tie-up of at least two of the clutches;
    based on said detecting, releasing one of the at least two of the clutches;
    based on whether a gear fault occurred, determining whether a tie-up condition existed; and
    based on said determining, reapplying pressure to the released clutch.

8. The method of claim 7 further comprising:
    detecting an output speed deceleration of the transmission greater than a predetermined threshold; and
    determining whether the deceleration was caused by a tie-up condition.

9. The method of claim 7 wherein said releasing is performed based on whether pressure is commanded to one of the at least two of the clutches.

10. The method of claim 7 further comprising:
    determining whether a startle condition cleared within a first predetermined time; and
    determining within a second predetermined time longer than the first A predetermined time whether the gear fault occurred.

11. The method of claim 10 wherein said reapplying pressure to the released clutch is performed upon expiration of the first predetermined time.

12. The method of claim 10 wherein said reapplying pressure to the released clutch is performed upon expiration of the second predetermined time.

13. The method of claim 7 further comprising:
    A detecting the gear fault; and
    detecting which of the at least two of the clutches caused the gear fault.

14. A transmission control system for a clutch-to-clutch transmission, said control system comprising a control module configured to:
    detect a possible tie-up of at least two clutches of the transmission;
    based on the detecting and on a previously commanded gear ratio, release one of the at least two of the clutches;
    determine whether a tie-up condition occurred; and
    based on the determining, reapply pressure to the released clutch or reapply a previously faulted gear ratio.

15. The control system of claim 14 wherein said control module reapplies pressure to the released clutch if no gear fault is established.

16. The control system of claim 14 wherein said control module reapplies the previously faulted gear ratio if a tie-up condition is determined to have occurred.

17. The control system of claim 14 wherein said control module detects an output speed deceleration of the transmission greater than a predetermined threshold; and
    determines whether the deceleration was caused by a tie-up condition.

18. The control system of claim 14 wherein said control module detects a gear fault and detects which of the at least two clutches caused the gear fault.

19. The control system of claim 14 wherein said control module releases one of the at least two of the clutches based on one or more pressure commands to the clutches.

* * * * *